(12) United States Patent
Kashiwagi et al.

(10) Patent No.: US 6,353,592 B1
(45) Date of Patent: Mar. 5, 2002

(54) OPTICAL RECORDING MEDIUM AND OPTICAL DISK DEVICE

(75) Inventors: Toshiyuki Kashiwagi, Tokyo; Tetsuhiro Sakamoto; Kiyoshi Ohsato, both of Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/242,911

(22) PCT Filed: Jun. 24, 1998

(86) PCT No.: PCT/JP98/02822

§ 371 Date: Jun. 9, 1999

§ 102(e) Date: Jun. 9, 1999

(87) PCT Pub. No.: WO99/00794

PCT Pub. Date: Jan. 7, 1999

(30) Foreign Application Priority Data

Jun. 27, 1997 (JP) .............................................. 9-172642

(51) Int. Cl.⁷ ................................................. G11B 7/24
(52) U.S. Cl. .................... 369/283; 369/286; 369/275.5; 428/64.4; 430/271.1
(58) Field of Search ................................ 369/275.2, 94, 369/13, 286, 283, 275.4, 275.5, 275.3, 284, 275.1, 280; 428/199, 64.4; 430/270.21, 271.1

(56) References Cited

U.S. PATENT DOCUMENTS

| | | | | |
|---|---|---|---|---|
| 4,525,412 A | * | 6/1985 | Nakane et al. ............... 428/199 |
| 5,244,706 A | * | 9/1993 | Hirata et al. ................ 428/64.8 |
| 5,397,597 A | * | 3/1995 | Soga et al. ............... 427/255.6 |
| 5,508,981 A | * | 4/1996 | Watanabe et al. ......... 369/275.5 |
| 5,726,970 A | * | 3/1998 | Kaneko et al. ........... 369/275.2 |
| 5,907,534 A | * | 5/1999 | Yamatsu ..................... 369/286 |
| 6,156,482 A | * | 12/2000 | Hamada et al. ......... 430/270.01 |

FOREIGN PATENT DOCUMENTS

| | | |
|---|---|---|
| JP | 5-33319 | 4/1993 |
| JP | 9-134547 | 5/1997 |
| JP | 9-147417 | 6/1997 |

* cited by examiner

*Primary Examiner*—David Hudspeth
*Assistant Examiner*—Kim-Kwok Chu
(74) *Attorney, Agent, or Firm*—Frommer Lawrence & Haug LLP; William S. Frommer; Matthew K. Ryan

(57) ABSTRACT

The present invention provides an optical recording medium including a recording layer and a light-transmitting layer successively formed on one side of a substrate, so that a light is applied from the side of this light-transmitting layer for performing an information recording and/or reproduction. On the opposite side of the substrate not having the light-transmitting layer, a water-proof film consisting of at least one layer is formed. This suppresses the skew, enabling to improve the information recording and/or reproduction characteristics for a higher recording density. Furthermore, if the light-transmitting layer has a thickness t=3 to 177 micrometers in an information signal section of the recording medium, and a thickness fluctuation $\Delta t \leq \pm 5.26 \, (\lambda/NA^4)$ micrometers (wherein NA is a numerical aperture and $\lambda$ is a wavelength of the recording/reproduction optical system), it is possible to realize a high NA and a high capacity.

36 Claims, 14 Drawing Sheets

OPTICAL RECORDING MEDIUM AND OPTICAL DISK DEVICE

TECHNICAL FIELD

The present invention relates to an optical recording medium and in particular, to an optical recording medium including a recording layer made from a metal reflection film and/or recording film and a light-transmitting layer formed on a substrate so that light is introduced from the side of this light-transmitting layer for performing an information recording and/or reproduction.

BACKGROUND ART

A conventional optical recording, as shown in FIG. 25, has a concave-convex pattern such as a pit and a groove formed on one main surface 121a on a light-transmitting substrate 121 formed by injection molding, and on the plane of this concave-convex pattern, a metal reflection film and/or recording film (metal reflection film 122 in this case), and protection film 123 are successively formed. In such an optical recording medium 120, light is introduced via an objective lens 124 from a surface 121b of the substrate 121 not having the protection film 123, so as record and/or reproduce an information signal.

As the method for further increasing the recording density of the optical recording medium, there has been suggested a method for increasing the numerical aperture of the optical pickup objective lens so as to reduce the spot diameter of the reproduction light and to perform recording according to this.

Recently, a DVD (digital versatile disc, hereinafter, referred to as DVD) is also available in market for recording various types of data such as images, music, computer data and the like. In this DVD, the substrate has a thickness in the order of 0.6 mm to cope with a short wavelength optical system having a high numerical aperture for realizing a high-density recording.

In such circumstances, as an optical recording medium of the next generation, Japanese Patent Application 9-109660, Specification, has suggested an optical recording medium capable of four-hour recording/reproduction on one side by the NTSC (National Television System Committee) method.

This optical recording medium, enabling a civil video disc recorder to perform 4-hour recording/reproduction, has an object to have a function as a new recording medium to replace the current video tape recorder. Moreover, this optical recording medium has a configuration and size identical to that of a digital audio disc so that it can easily be handled by users who are accustomed to use digital audio discs. Furthermore, when this optical recording medium is a disc-shaped product, it is possible to utilize the high access speed which is the greatest feature of the disc shape, realizing a small-size convenient recording medium. It is also possible to provide various functions such as an instantaneous recording and reproduction as well as a trick play and edition.

The aforementioned optical recording medium need to have a recording capacity of 8 GB or more for providing such various functions.

However, in the conventional optical recording medium, especially when the size is identical to that of a digital audio disc and the information recording layer is provided only on one side, it is impossible to obtain 8-GB recording capacity. For example, in the case of DVD considered to have a high recording capacity, an information signal section area, i.e., in a region of radius of 24 to 58 mm from the center, only 4.7-GB recording capacity can be obtained, assuming the wavelength λ to be 0.65 micrometers and the optical system numerical aperture (hereinafter, referred to as NA) to be 0.6.

For example, in order to assure a recording capacity of 8 GB or more using the DVD format as the signal format such as the ECC (error correction code) and modulation method, it is necessary to satisfy the following Expression 1.

$$4.7 \times (0.65/0.60 \times NA/\lambda^2 \geq 82 \ldots \quad (1)$$

According to this Expression 1, NA/lamda should be equal to or greater than 1.20. That is, it is necessary to reduce the wavelength or increase the NA.

Here, for example, if the NA is increased, it is necessary to reduce the thickness where the reproduction light transmits. This is because increase of the NA reduces the allowance of the aberration generated by the angle of the disc surface displaced from the vertical direction with respect to the optical pickup optical axis (a so-called tilt angle, proportional to the square of the product of the reverse number of the light source wavelength by the objective lens NA). This tilt angle is easily affected by the aberration due to the substrate thickness. Accordingly, the substrate thickness is reduced so as to minimize the affect from the aberration to the tilt angle.

Moreover, for the same reason, the fluctuation of thickness where the reproduction light transmits should also be within a predetermined range.

It is considered that a further higher recording density will be required in future with reduction in the substrate thickness. To cope with this, a shown in FIG. 26, there has been suggested an optical recording medium 130 including a convex-concave pattern formed on a substrate 131 whose main surface 131a is covered with a metal reflection film and/or recording film (here, metal reflection film 132), and a light-transmitting layer 133 formed successively in this order, so that light is applied from the side of this light-transmitting layer 133 for recording and/or reproducing an information signal. In this optical recording medium 130, the light-transmitting layer 133 is made thin to answer the high NA of the objective lens 134. On the other hand, in an optical recording medium, sometimes an inclination (hereinafter, referred to as a skew) of the optical recording medium with respect to the optical axis is generated to affect the signal characteristic.

This skew is usually caused by a warp of the substrate itself due to the injection molding, shrinkage of the protection film formed on the substrate, or warp of the substrate due to water absorption.

The skew present in the optical recording medium immediately after production is called initial skew. This initial skew has a configuration determined by the relationship of the force of the substrate and the force of the protection film formed. This initial skew is changed by mitigation of the stress inside the substrate and the hardening of the protection film to be stabilized finally. Furthermore, the skew due to the warp of the substrate itself and shrinkage of the protection film is changed with lapse of time for a long period of time.

On the other hand, the water absorption amount of the substrate is changed by an environmental change such as a temperature change and a humidity change. The water absorption may expand the substrate, generating a skew. Such a skew caused by an environmental change, especially the skew caused by water absorption is often seen in an optical recording medium having a signal plane only on one side, i.e. asymmetric configuration. This is because the optical recording medium having asymmetric configuration has water absorption varied over the substrate. Such a skew caused by water absorption is present in a transient condition such as water absorption and water discharge and disappears when the environment is stabilized.

The problem of the aforementioned skew in the optical recording medium, especially the skew due to water absorption is solved by waiting for half day or so. In case of a reproduction-dedicated medium, reproduction may be disabled temporarily but the medium returns to a reproduction-enabled state after waiting half day.

However, when the medium is for both of recording and reproduction, it becomes impossible to perform preferable recording and reproduction. Especially, recording cannot be performed at a desired moment and the user must miss a scene that he/she wants to record. Accordingly, in an optical recording medium capable of recording, this skew should be suppressed.

As a method to suppress the skew due to water absorption in the conventional optical recording medium 120 as shown in FIG. 25, a water-proof film can be formed on a main surface 121b of the substrate not having the protection film 123.

The water-proof film may be a metal film. In the optical recording medium 120 as shown in FIG. 25, recording and reproduction are performed by applying light from the surface 121b of the substrate not having the protection film 123. Accordingly, if a metal film as a water-proof film is formed on the surface 121b opposite to this protection film 123, it becomes impossible to assure light-transmittance for recording and reproduction because of the non-transparent metal.

Moreover, as another method for suppressing the skew due to water absorption, the substrate may be subjected to a surface treatment such as SiO so as to reduce the skew. However, in this case, a strict film formation condition should be satisfied so as to satisfy the light transmittance feature. Accordingly, there arise problems of high costs of facility, increase of production steps, lowering of yield, and the like.

Furthermore, in the optical recording medium performing recording and reproduction by applying light from the side of a light transmitting layer as shown in FIG. 26, it is possible to increase the lens NA for further increasing the recording density. However, the aforementioned skew is generated in the same way as in the conventional optical recording medium which affects the signal characteristic. There is a need for a technique for suppressing the skew.

Furthermore, it is also desired to obtain an 8-GB recording capacity or more in the optical recording medium including such a light-transmitting layer so that light is applied from the side of this light-emitting layer.

That is, in the aforementioned optical recording medium, it is necessary to suppress the skew as much as possible so as to increase the recording and/or reproduction characteristic, enabling to further increase the recording density as well as to cope with a high NA and a high capacity such as 8-GB capacity or more.

DISCLOSURE OF THE INVENTION

The object of the present invention is to provide an optical recording medium capable of suppressing a skew so as to enhance the recording and/or reproduction characteristic, enabling to realize a further higher recording density. Another object of the present invention is to provide an optical recording medium capable of realizing a high NA and a high capacity, enabling to record an information of 8 GB or more. Still another object of the present invention is to provide an optical disc apparatus that can preferably be used for recording and/or reproduction of an information of the optical recording medium according to the present invention.

The optical recording medium according to the present invention includes a light-transmitting layer on a main surface of a substrate, so that light is applied from the side of this light-transmitting layer for performing recording and/or reproduction. The optical recording medium has a water-proof film formed on the other main surface.

Here, in the optical recording medium according to the present invention, it is preferable that the water absorption ratio of the main surface having the water-proof film be 0.1% or below.

Moreover, in the optical recording medium according to the present invention, the aforementioned light-transmitting layer has a thickness t=3 to 177 micrometers at least in the region of an information signal section where an information signal is recorded. If $\Delta t$ is assumed to be a thickness fluctuation of the light-transmitting film, the numerical aperture NA and the wavelength lamda of an optical system for recording and/or reproducing the optical recording medium satisfy a relationship as follows: $\Delta t \leq \pm 5.26 \, (\lambda/NA^4)$ micrometers.

It should be noted that in the optical recording medium according to the present invention, it is preferable that the track pitch P satisfy $P \leq 0.64$ micrometers; and the skew $\Theta$ satisfy $\Theta \leq \pm 84.115$ degrees $(\lambda/NA^3/t)$.

Furthermore, it is preferable that the aforementioned optical recording medium according to the present invention be recorded or reproduced by a recording/reproduction optical system that satisfies the wavelength $\lambda \leq 0.68$ micrometers and the numerical aperture NA defined as $NA/\lambda > 1.20$. It is preferable to use an optical disc apparatus comprising a laser source having a wavelength equal to or below 680 nm and a lens having a numerical aperture NA equal to or above 0.7 for focusing the laser beam onto a signal recording plane.

In the optical recording medium having the aforementioned configuration according to the present invention, a water-proof film is formed on the opposite side of the substrate not having the light-transmitting layer. This enables to suppress water absorption, enabling to suppress the skew.

Moreover, in the optical recording medium according to the present invention if the water absorption ratio is suppressed to 0.1% or below, the skew can be suppressed more effectively. Here, especially the skew caused by water absorption can be suppressed effectively.

Furthermore, in the optical recording medium according to the present invention, it is further preferable that the light-transmitting layer have a thickness t defined as t=3 to 177 micrometers at least in the information signal section of the recording layer where an information signal is recorded, and a thickens fluctuation $\Delta t$ defined as $\Delta t \leq +5.26 \, (\lambda/NA^4)$ micrometers, assuming lamda and NA as the wavelength and the numerical aperture of the recording and/or reproducing optical system; and that the track pitch P be defined as $P \leq 0.64$, the skew $\Theta$ be defined as $\Theta \leq \pm 84.115$ degrees $(\lambda/NA^3/t)$, and the wavelength lamda be defined as $\lambda \leq 0.68$; and that recording or reproduction be performed using a recording/reproduction optical system having the numerical aperture NA that satisfies the relationship $NA/\lambda \geq 1.20$. This enables to realize a high NA and a high recording capacity such as 8 GB or above. Here, such a recording or reproduction can easily be performed by using an optical disc apparatus including the aforementioned recording/reproduction optical system having a laser source of wavelength equal to or below 680 nm and a lens of numerical aperture NA equal to or above 0.7.

BEST MODE FOR CARRYING OUT THE INVENTION

Description will now be directed to embodiments of the present invention with reference to the attached drawings.

As a first embodiment of the optical recording medium according to the present invention, an explanation will be given on a reproduction-dedicated optical recording medium. However, the optical recording medium may be a magneto-optical recording medium capable of recording and reproduction.

Figure 1:
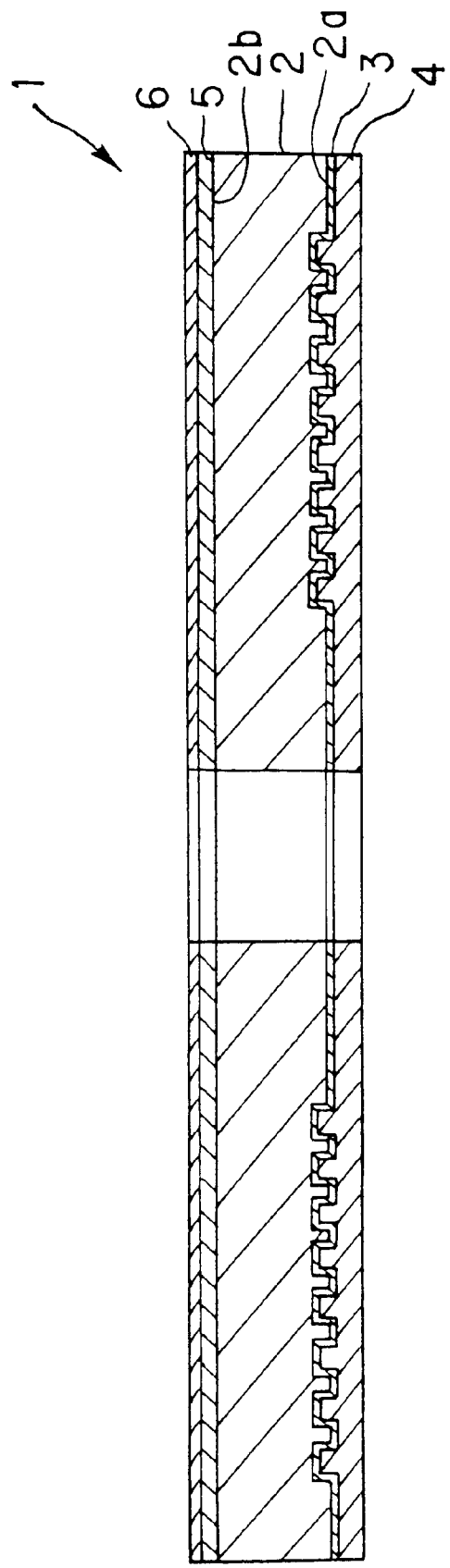
FIG. 1 is cross sectional view showing an optical recording medium according to the present invention.

As shown in FIG. 1, the optical recording medium 1 according to the present invention includes a metal reflection film 3 and a light-transiting layer 4 successively formed on a main surface 2a of a substrate having a convex-concave pattern on its surface.

The optical recording medium 1 according to the present invention includes a water-proof film 5 and corrosion-preventing film 6 are successively formed on the opposite surface 2b of the substrate 2 not having the light-transmitting layer 4. In this optical recording medium, light is introduced via an objective lens from the side of the light-transmitting layer 4 for reproducing an information signal.

As shown in FIG. 1, the substrate 2 has a convex-concave pattern on the main surface 2a. This convex-concave pattern serves as a signal pattern. The substrate 2 is made from a polycarbonate resin or methacrylic resin. However, from the viewpoint of a thermal characteristic and mass production, it is especially preferable to use the polycarbonate resin. This substrate 2 is formed by way of injection molding or the like. It should be noted that, it is also possible to use an acrylic resin, polyolefin resin, epoxy resin, and other plastic materials.

The metal reflection film 3 is formed so as to cover the convex-concave pattern of the substrate 2. This metal reflection film 3 is made from Al, Au, Ag, or the like. From the viewpoint of the reflection characteristic, it is preferable to use a material containing at least Al. Moreover, this metal reflection film 3 is formed by way of ion beam sputter or magnetron sputter using the aforementioned materials.

The light-transmitting layer 4 is formed by applying an ultraviolet-ray hardening resin by way of spin coat method or the like, which is then hardened using ultraviolet ray.

The water-proof film 5 is formed on the side 2b of the substrate 2 not having the light-transmitting layer 4. The water-proof film 5 is made from a material such as Al, Au, Ag, Ni, Cr, Cu, Pt, Ti, and other metal or alloy using these metals, or stainless steel alloy, or SiNx, SiOx, SiNxOy, SiC or other dielectric films or organic films. Moreover, the water-proof film 5 is formed using the sputter method. It should be noted that when the water-proof film is formed using the same material as the metal reflection film 3, it is possible to form the water-proof film simultaneously with the metal reflection film 3 from both sides of the substrate 2 by way of the sputter method.

As has been described above, in the optical recording medium when the optical recording medium has an inclination with respect to the optical axis, i.e., when a skew is present, the recording/reproduction characteristics are deteriorated. Normally, the maximum allowance of this skew angle (hereinafter, referred to as a skew value) is 0.6 degrees in case of a reproduction-dedicated optical disc, and 0.4 degrees in a large-capacity optical disc such as a DVD having an identical size as the reproduction-dedicated optical disc and a recording density 6 to 8 times higher than the reproduction-dedicated optical disc.

From this, it can be said that in the optical recording medium of the next generation for a higher recording density, the maximum allowance of the skew value should be 0.4 degrees. That is, n order obtain a skew value of 0.4 degrees or below in such an optical recording medium 1, the skew caused by water absorption should be 0.2 degrees or below, assuming 0.2 degrees or below for the skew value caused by the warp of the substrate 2 itself or shrinkage of the protection film 5.

Here, in the optical recording medium 1 according to the present invention, the water-proof film 5 formed on the side 2b of the substrate 2 not having the light-transmitting layer enables to reduce the water absorption ratio of the optical recording medium 1 as a single body to 0.1% or below. As a result, the skew value of the optical recording medium 1 is 0.2 degrees or below. Here, the water absorption ratio is determined according to the JIS K 7209 specification on plastic water absorption ratio and boiling water absorption ratio.

Thus, in the optical recording medium according to the present invention having the water-proof film 5 can suppress the water absorption ratio too 0.1% or below and accordingly, it is possible to suppress the skew caused by water absorption, to 0.2 degrees or below. This enables to improve the recording and/or reproducing characteristic, enabling to obtain a further higher recording density.

Moreover, especially when Al is used as a material of the water-proof film 5, it is preferable that the water-proof film 5 have a thickness of 10 nm or above. When the water-proof film 5 made from Al has a thickness of 10 nm or above, the skew can be suppressed to 0.2 degrees or below, enabling to improve the recording and/or reproduction characteristic, enabling to realize a further higher recording density.

Moreover, in the optical recording medium 1 according to the present invention, a data recording and/or reproduction is performed by applying light from the side of the light-transmitting layer 4. Accordingly, the aforementioned water-proof film 5 may be a film which is not transparent. It should be noted that in the optical recording medium 1, the water-proof film 5 can also be used as a label. Moreover, this optical recording medium 1 may be contained in a cartridge.

The corrosion-preventing film 6 is formed on the water-proof film 5 for preventing corrosion. This corrosion-preventing film 6 may be made from an ultraviolet-ray hardening resin. It is especially preferable to use an acryl urethane ultraviolet-ray hardening resin. It should be noted that it is preferable that the corrosion-preventing film 6 be made from an ultraviolet-ray hardening resin having a higher hardening shrinkage than the ultraviolet-ray hardening resin constituting the light-transmitting layer 4. This enables the corrosion-preventing film 6 to correct the skew.

It should be noted that when the water-proof film 5 is made from Au, Ag, Cu, Cr or other metal or silicon oxide which are not easily affected by oxidization, there is no need of forming the corrosion-preventing film 6 and the step for forming the corrosion-preventing film 6 can be omitted. This enables to simplify the production procedure.

Moreover, in the optical recording medium 1 according to the present invention, the substrate 2 may be formed from polycarbonate having an excellent productivity and functionability. Moreover, it is possible to suppress a high water absorption feature of the polycarbonate. Consequently, the optical recording medium 1 according to the present invention can be easily produced in mass production without greatly modifying the production procedure and that with a high quality.

Description will now be directed to experiments performed to confirm the effects of the present invention.

Experiment 1

Firstly, substrates formed by way of injection molding using three different materials having absorption ratio of 0.01%, 0.2% and 0.3%, respectively. Next, a metal reflection film was formed using the sputter method on a convex-concave pattern of the substrates. Furthermore, a light-transmitting layer was formed on the metal reflection film by way of the spin coat method using an ultraviolet-ray hardening resin.

Figure 2:
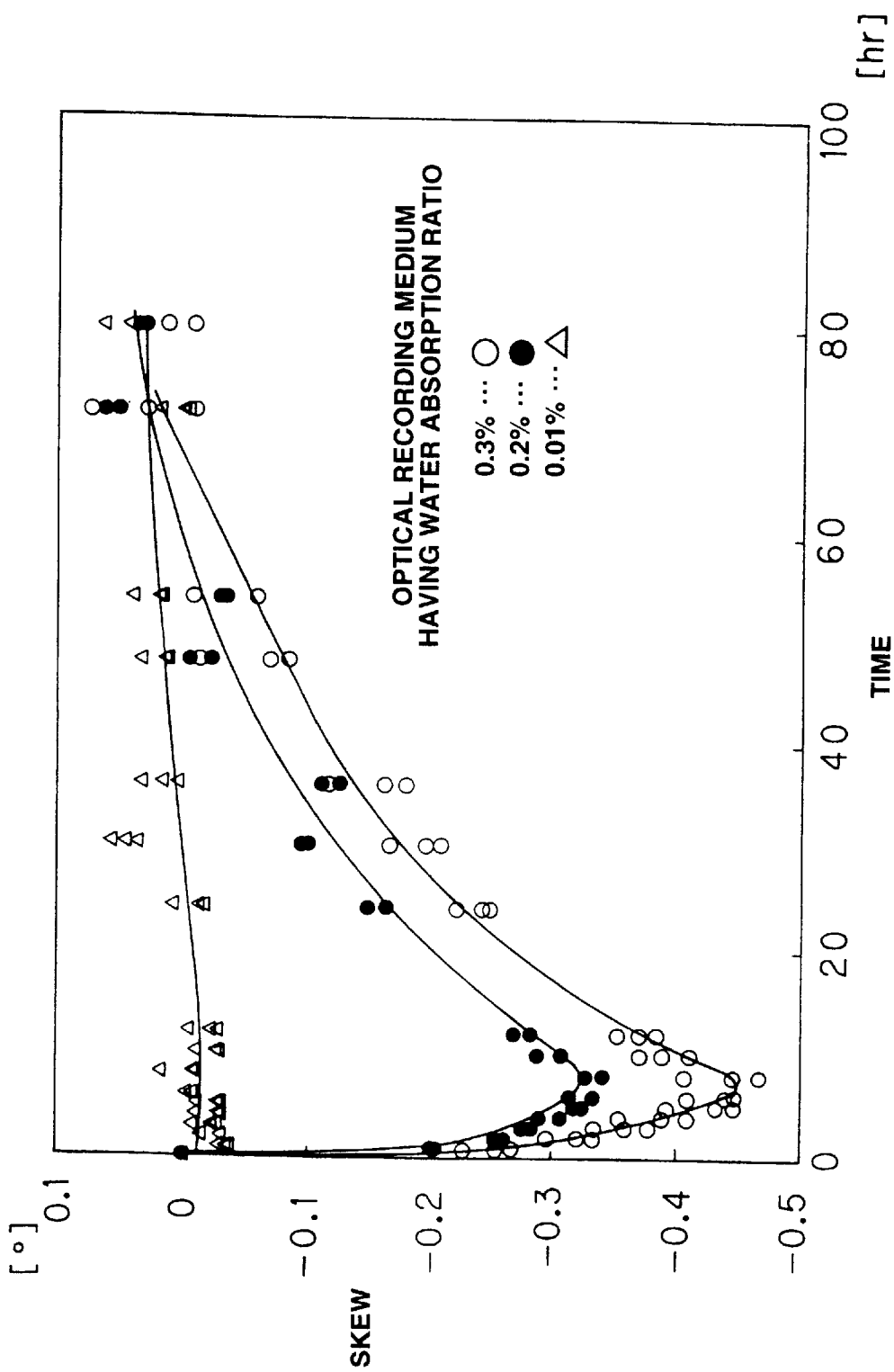
FIG. 2 shows a relationship between the water absorption and the skew along the time lapse.

The optical recording media thus prepared were left as they were under an environment of temperature 30° C. and humidity 95% for three days, after which the optical recording media were placed under an environment of temperature 23° C. and humidity 50%, so as to check the skew value change according to the time lapse. The check results are shown in FIG. 2.

As has been described above, in an optical recording medium for a high recording density, the skew value should be 0.2 degrees or below.

As is clear from the results shown in FIG. 2, in order to suppress the skew value change amount to 0.2 degrees or below, it is preferable that the optical recording medium itself has a water absorption ratio of about 0.1% or below.

Moreover, if the water absorption ratio exceeds 0.1%, the skew value change becomes greater than 0.2 degrees. The substrate expands greatly, increasing the inclination of the optical recording medium. As a result, in the optical recording medium having a water absorption ratio greater than 0.1%, the recoding/reproduction characteristic is deteriorated. For example, it becomes impossible to perform a preferable recording when desired.

Experiment 2

In the same way as Example 1, a metal reflection film and a light-transmitting layer were successively formed on the substrate 2. Moreover, a water-proof film was formed on the opposite side of the substrate not having the light-transmitting layer, so as to have a film thickness of 10 nm, and 30 nm. Furthermore, a corrosion-preventing film was formed on the water-proof film to obtain an optical recording medium. In contrast to this, an optical recording medium was also prepared by successively forming the metal reflection film and the light-transmitting layer but without forming the water-proof film.

Figure 3:
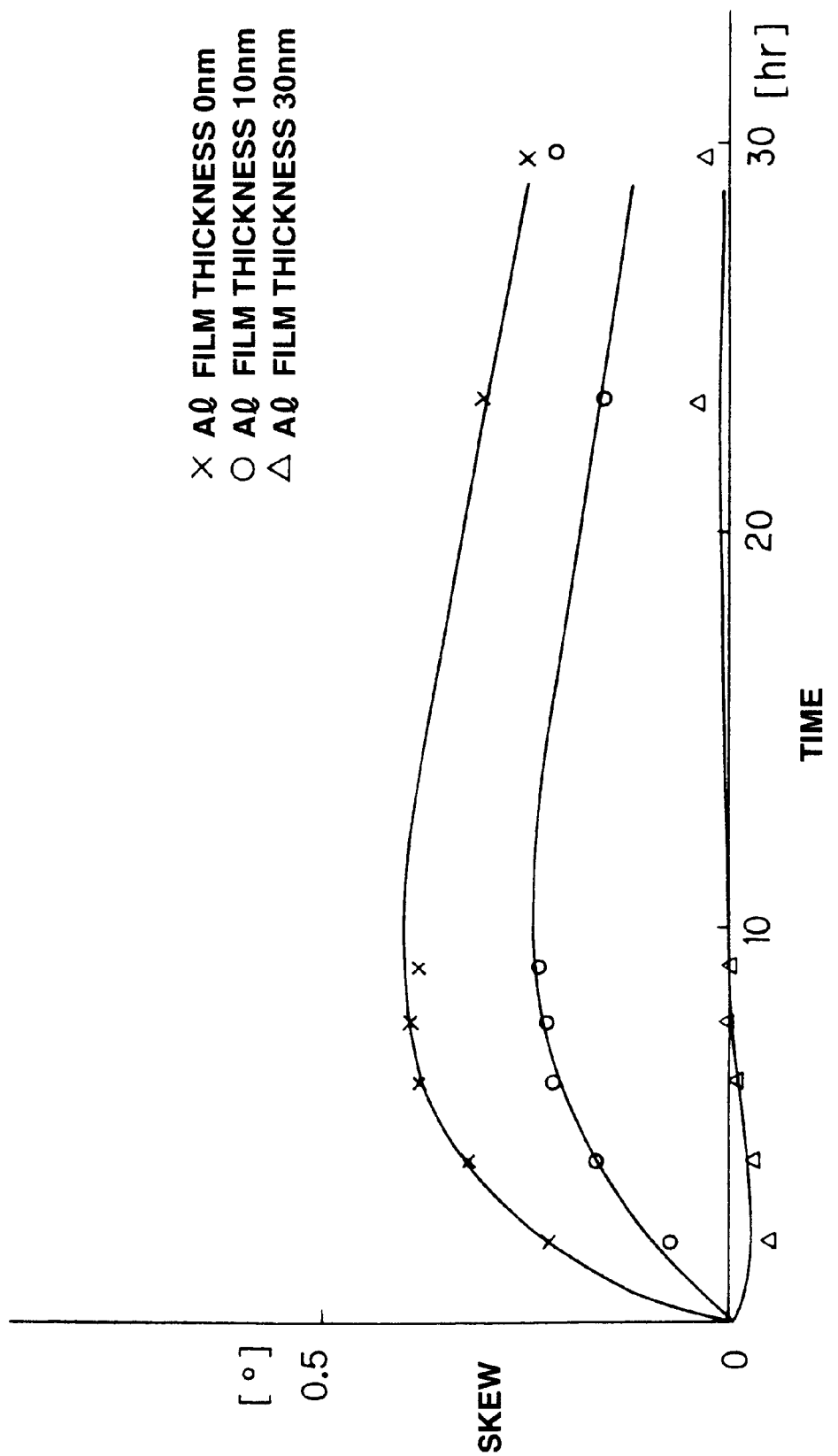
FIG. 3 shows a relationship between the water-proof film and the skew along the time lapse.

Thus, the optical recording medium having no water-proof film, the optical recording medium having the water-proof film of 10 nm, and the optical recording medium having the water-proof film of 20 nm were respectively left as they were under an environment of temperature 30° C. and humidity 95% for three days. After this, these optical recording media were respectively placed under an environment of temperature 23° C. and humidity 50%, so as to check skew values according to the time lapse. The check results are shown in FIG. 3.

As can be understood from the results of FIG. 3, in order suppress the skew value change mount to 0.2 degrees or below, it is preferable that the water-proof have a film thickness of 10 nm or above.

Moreover, if the water-proof film has a film thickness smaller than 10 nm, the optical recording medium expands, increasing the inclination of the optical recording medium. As a result, in an optical recording medium having the water-proof film of film thickness smaller than 10 nm, the recording/reproduction characteristic is deteriorated. For example, it becomes impossible to perform a preferable recording when desired.

Next, description will be directed to an optical recording medium according to a second embodiment. In this embodiment also, explanation will be given on a reproduction-dedicated optical recording medium.

This optical recording medium also has a recording layer and a light-transmitting layer successively formed on a main side of a substrate so that light is applied from the side of this light-transmitting layer for a information recording and/or reproduction, and has at least one layer of water-proof film formed on the opposite side of the substrate not having the aforementioned light-transmitting layer.

The optical recording medium according to this embodiment enables to record an information of 8 GB or so.

Firstly, explanation will be given on the thickness of the light-transmitting layer. In general, the disc skew margin Θ is in a particular correlation with the wavelength λ and numerical aperture NA of the recording/reproduction optical system and the thickness t of the light-transmitting layer.

Japanese Patent Publication 3-225650 discloses the relationships between these parameters and the skew Θ based on an example of a digital audio disc (so-called compact disc, hereinafter referred to as CD) which has proved a sufficient playability.

According to this disclosure, it is necessary to satisfy Θ≦±84.115 degrees (λ/NA$^3$/t), which is satisfied when the skew is 0.6 degrees in case of CD, and 0.4 degrees in case of DVD as has been described above. This can also be applied to the optical recording medium according to the present invention. In the optical recording medium according to the present invention, the skew Θ is set to 0.4 degrees or below. This value of 0.4 degrees is a limit value from the viewpoint of mass production. If the value is set smaller than this, the yield is significantly lowered, increasing the production cost.

Assuming Θ=0.4 degrees and considering that the laser beam used for recording and/or reproduction is to have a short wavelength and NA should be increased, the thickness of the light-transmitting layer can be calculated as follows. Firstly, if λ=0.65 micrometers, NA should be as NA/λ≧1.20 to 0.78. From this, it is possible to obtain t≦288 micrometers.

Moreover, suppose the wavelength is further reduced in future to lamda=0.4 micrometers. If the NA remains as NA≧0.78, t=177 micrometers. In this case, considering use of the production facility for the CD having a substrate with thickness of 1.2 mm, the optical recording medium according to the present invention has a thickness of 1.38 mm at the maximum.

Moreover, considering the magnetic field modulation of the magneto-optical recording medium (hereinafter, referred to as MO), it is preferable that the light-transmitting layer have a small thickness. For example, if the thickness is set to 30 micrometers or below, it is possible to easily obtain a recording/reproduction with the MO.

On the other hand, the lower limit of the thickness of the light-transmitting layer is determined by the protection function of the light-transmitting layer for protecting the recording film or the reflection film, and preferably is 3 micrometers or above if considering the reliability and the affect from the two-lens unit collision.

As has been described above, in order to increase the recording density, it is indispensable to increase NA/λ. In this case, for example, if 8 GB is to be achieved as the recording capacity, the NA should be set at least 0.7 or above, and the laser should have a wavelength λ equal to or below 0.68 micrometers. Here, as has been described above, the thickness of the light-transmitting layer and the skew are in the aforementioned relationship. If the current red laser and the future blue laser are both to be taken into consideration, it is preferable that the thickness of the light-transmitting layer be set to 3 to 177 micrometer.

Consequently, in the optical recording medium according to the present embodiment, the thickness t of the light-transmitting layer is set to 3 to 177 micrometers.

Next, explanation will be given on the track pitch. In order to achieve the 8-GB recording capacity as in the present invention, it is necessary to change the track pitch P and the line density d, so as to follow the following Expression (2) and Expression (3).

$$(0.74/P) \times (0.267/d) \times 4.7 \geq 8 \quad (2)$$

$$d \leq 0.1161/P \text{ (micrometer/bit)} \quad (3)$$

For example, if P=0.56 micrometers, then d≦0.206 (micrometer/bit). This is based on the DVD ROM (read only memory). If a progress in the recording/reproduction signal processing technique is taken into consideration (such as application of PRML or reduction in the ECC redundancy), a line density increase in the order of 15% can be expected, enabling to increase the track pitch P. Accordingly, the track pitch P can be calculated as 0.64 micrometers at the maximum.

Consequently, in the optical recording medium according to the present embodiment, the track pitch P is set as P≦0.64 micrometers.

Furthermore, in the optical recording medium according to the present embodiment, the tolerance for the track pitch fluctuation ΔP is also strict. If the CD or DVD recording/reproduction parameters are to be directly transferred, then the DVD pitch 0.74 micrometers and the tolerance ±0.03 can be turned into ΔP≦±0.03P/0.74=±0.04P. Therefore, if P=0.56, ΔP≦±0.023 micrometers.

Accordingly, in the optical recording medium according to the present embodiment, the track pitch fluctuation ΔP is set as ΔP≦±0.04P.

Next, explanation will be given on the light-transmitting layer thickness fluctuation. In the optical recording medium according to the present embodiment, the light-transmitting layer thickness fluctuation Δt also should have a strict accuracy.

If the thickness of the light-transmitting layer is shifted from the design center of the reproduction objective lens, the thickness error gives an aberration amount proportional to $NA^4$ and proportional to the wavelength. Accordingly, when a high density is to be obtained by a high NA and a short waveform, the amount, light-transmitting layer thickness fluctuation should be limited to a strict range.

More specifically, in the case of CD system, the practical CD has NA=0.45 and the light-transmitting layer thickness error specified within a range of plus and minus 100 micrometers. Moreover, in the case of DVD, NA=0.6 with an error in range of plus and minus 30 micrometers. That is, the light-transmitting layer thickness fluctuation Δt can be expressed as follows if based on the allowance plus and minus 100 micrometers for the CD.

$$\Delta t = \pm (0.45/NA)^4 \times (\lambda/0.78) \times 100 = \pm 5.26 \times (\lambda/NA^4) \text{ micrometers} \quad (4)$$

Figure 4:
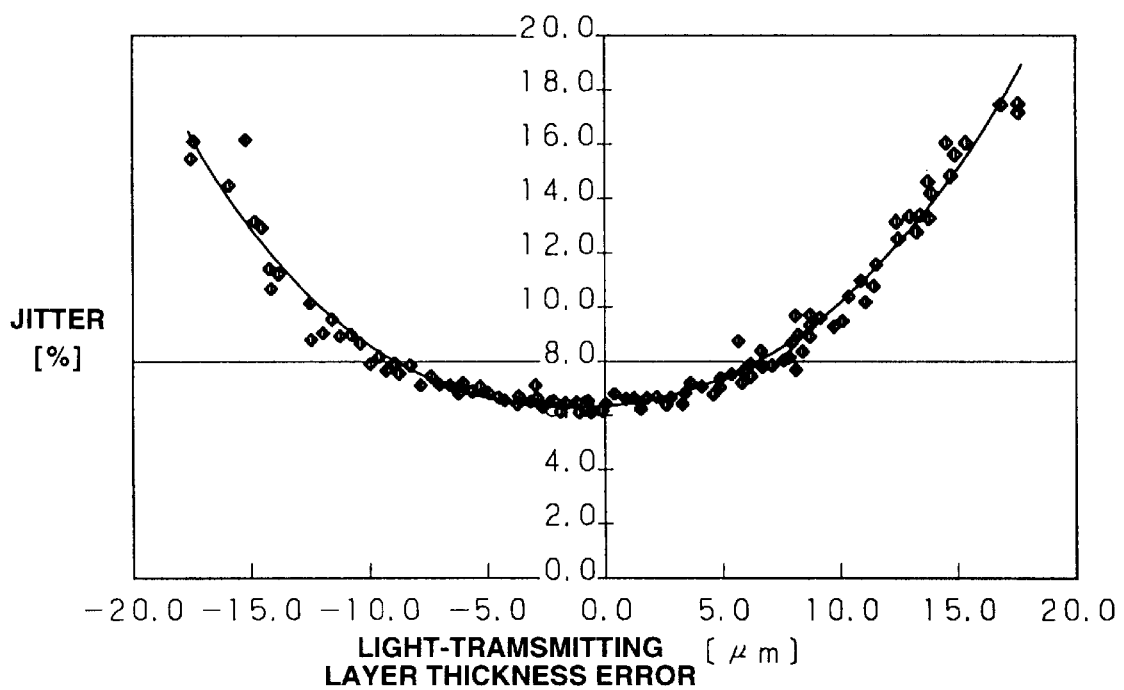
FIG. 4 shows a relationship between the light-transmitting layer thickness error and the jitter value.

Here, an experiment was carried out for the relationship between the light transmitting thickness error from 100 micrometers and the jitter value, setting the wavelength λ=0.68 micrometers, and NA=0.875. FIG. 4 shows results of the experiment.

As can be understood from FIG. 4, the jitter reference of 8% having no perturbation such as skew in a DVD corresponds to about plus and minus 7 micrometers. The aforementioned expression gives a value of plus and minus 6 micrometers. Therefore, the disc medium satisfying this specification enables to obtain a preferable signal.

Consequently, as the recording density increases, the fluctuation Δt allowed for the light-transmitting layer thickness should be within a range of plus and minus 5.26 ×(λ/$NA^4$) micrometers.

Accordingly, in the optical recording medium according to the present invention, assuming Δt for the light-transmitting layer thickness fluctuation, the relationship between the numerical aperture NA and the wavelength lamda of the optical system for recording and/or reproducing to/from the optical recording medium is set so as to satisfy: Δt≦±5.26 (λ/$NA^4$) micrometers.

Next, explanation will given on the surface roughness Ra to which light is applied for recording and/or reproduction. The aforementioned light-transmitting layer thickness fluctuation is assumed to be uniform within a disc surface where the laser beam is applied for recording and/or reproduction. It is possible to correct the aberration by shifting the focus point. However, if there is a light-transmitting layer thickness fluctuation within this area, i.e., within the spot, the aberration cannot be corrected by adjusting the focus point. This amount should be suppressed within plus and minus 3λ/100 around the thickness center value.

Consequently, in the optical recording medium according to the present embodiment, the surface where the recording and/or reproduction beam is applied has the surface roughness Ra within plus and minus 3λ/100 in the spot size area.

Next, explanation will be given on the eccentricity. The eccentricity E is specified as follows with respect to 50 micrometers of DVD: E≦50×P/0.74=67.57P micrometers.

Thus, in the optical recording medium according to the present embodiment, the eccentricity E is set as follows: E≦67.57P micrometers.

That is, in the optical recording medium according to the present embodiment, at least in the information recording area where an information signal is recorded has the light-transmitting layer thickness t set to 3 to 17 micrometers; the aforementioned light-transmitting layer thickness fluctuation Δt is in relationship with the numerical aperture NA and the wavelength lamda of the optical system for recording and/or reproducing to/from the optical recording medium to satisfy: Δt≦±5.26 (λ/$NA^4$) micrometers; the track pitch P is set as P≦0.64 micrometers; the track pitch fluctuation ΔP is set as ΔP≦±0.04P; the line density d is set as d≦0.1161/P (micrometer/bit); the disc skew Θ is set as Θ≦±84.115 degrees (λ/$NA^3$/t); the eccentricity E is set as E=67.57P micrometers; the surface roughness Ra in the spot size area is set as Ra=within±3λ/100; and the recording/reproduction optical system has a wavelength lamda as λ≦0.68 micrometers, so as to satisfy NA/λ≧1.20, thus enabling to assure the 8-GB recording capacity and achieve a high recording density.

When producing the optical recoding medium according to the present invention, it is necessary to use a stamper having a pitch and pitch fluctuation that satisfy the aforementioned specifications required for the optical recording medium according to the present invention. With this stamper, injection molding is performed to prepare the substrate. Such a high-accuracy stamper with small pitch fluctuations is difficult to produce using a conventional feed screw configuration, and it is produced by using a stamper exposure apparatus having a linear motor feed configuration. Furthermore, the optical system should be covered with a cover member for eliminating air fluctuations. In order to remove the vibration of the cooling water for the exposure laser, a vibration-preventing member is provided between the laser and the exposure apparatus.

Moreover, in the present embodiment, on the signal plane of this substrate, a reflection film or a recording film is formed so that recording/reproduction is performed from above. Accordingly, considering deformation of the signal configuration due to film formation, it is necessary to form a pit on the substrate.

For example, in the case of 10-GB ROM, if the signal pit asymmetry is 25% when viewed from the side of the substrate, the asymmetry viewed from the opposite side is 10%. That is, in the present embodiment, the signal is to be read from the opposite side and accordingly, in order to form a pit of 10% asymmetry viewed from the side of light radiation, the pit formed on the substrate should have a configuration of 25% asymmetry.

Similarly, for the groove formed on the recording disc, in the case when the groove duty is changed by the recording film such as in groove recording (recording/reproduction into a concave portion viewed from the recording/reproduction plane), the groove width is reduced. Accordingly, it is necessary to prepare a wider configuration in the stamper. For example, in the case of land/groove recording, in order to obtain the land and groove width duty of 50% viewed from the light radiation side, it is preferable to set 55 to 65% viewed from the substrate side.

Figure 5:
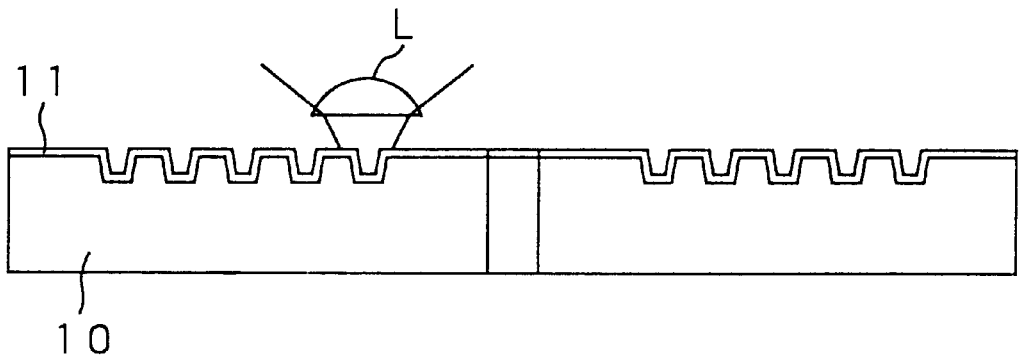
FIG. 5 is a cross sectional view schematically showing an essential portion of a recording layer formed on a substrate.

Next, as shown in FIG. 5, a recording film (hereinafter, referred to as an information recording film) or a reflection film is formed in an information signal section 11 of the substrate 10, so as to serve as a recording layer. For example, if the disc is ROM, a reflection film of Al or the like is formed with a thickness of 20 to 60 nm.

The information recording film is made, for example, from a phase change material: an Al film, $ZnS—SiO_2$, GeSbTe, and $ZnS—SiO_2$, are successively formed in this order.

Moreover, in the case of a magneto-optical disc, an Al film, SiN, TbFeCo, and SiN are successively formed in this order.

Moreover, in the case of a writable disc, Au or Al is sputtered, after which an organic pigment film of cyanic or phthalocyanin is applied by way of spin coating and dried.

In the example of FIG. 5, a recording/reproduction light is applied through a recording/reproduction objective lens L from the side opposite to the substrate 10.

Figure 6:
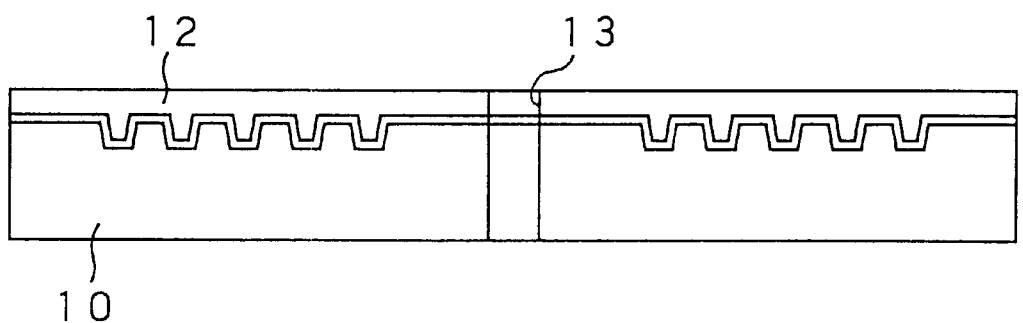
FIG. 6 is a cross sectional view schematically showing an essential portion of an example of the optical disc according to the present invention.

Next, as shown in FIG. 6, the information recording film is covered with a light-transmitting layer 12 formed from an ultraviolet-ray hardening resin. For example, an ultraviolet-ray hardening resin is applied as droplets onto the film formation surface of the substrate 10 prepared by one of the aforementioned methods and the resin droplets are spread by rotation to form the light-transmitting layer 12.

This ultraviolet-ray hardening resin preferably has a viscosity of 300 cps to 6000 cps, so as to form the aforementioned thickness.

For example, the ultraviolet-ray hardening resin used has the viscosity of 5800 cps at 25° C., by rotating the substrate with droplets of the ultraviolet-ray resin at 2000 rpm for 11 seconds, it is possible finally to form the light-transmitting layer 12 having the thickness in the order of 100 micrometers.

Here, if the droplets of the ultraviolet-ray hardening resin are applied to an area within a radius of 25 mm from the center and spread by rotation, the relationship between the eccentric force and the viscosity resistance causes a difference of thickness between the inner portion and the outer portion of the area. This difference amounts up to 30 micrometers, disabling to satisfy the aforementioned thickness range.

To eliminate this, it is advantageous to fill the center hole 13 of the substrate 10 with some kind of means when dripping the ultraviolet-ray hardening resin. For example, it is possible to prepare a polycarbonate sheet having a thickness of 0.1 mm and process it into a circular shape of Φ30 mm diameter, which is adhered to the center portion of the substrate 10 before dripping the ultraviolet-ray hardening resin onto the center portion to be spread by rotation. After the ultraviolet-ray hardening resin is hardened by applying ultraviolet ray, the center hole is punched through. By using this process, it is possible to obtain a light-transmitting layer having a thickness with a difference between the inner and the outer portion within 10 micrometers p-p (peak to peak).

It should be noted that when forming the light-transmitting layer 12, the ultraviolet-ray hardening resin may spread out of the disc outer circumference. Accordingly it is preferable to make the disc diameter 120 mm+5 mm at maximum based on the CD diameter (120 mm).

Figure 7:
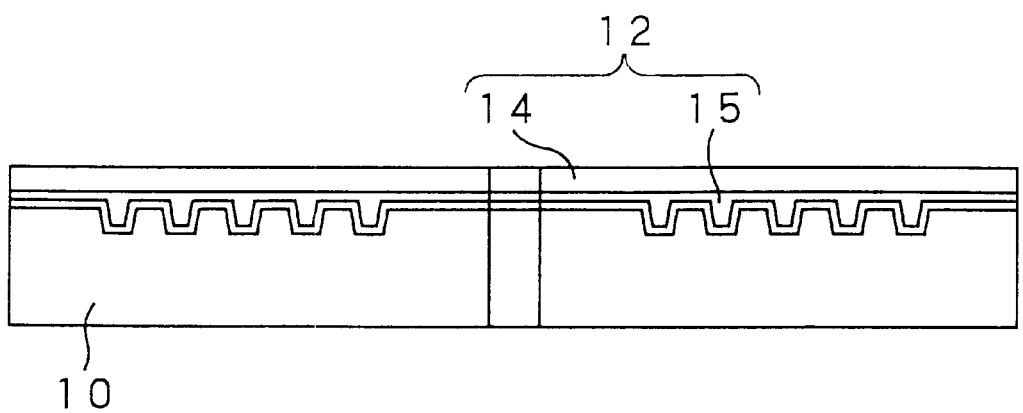
FIG. 7 is a cross sectional view schematically showing an essential portion of another example of the optical disc according to the present invention.

Moreover, as shown in FIG. 7, it is also possible to form the light-transmitting layer 12 by adhering a polycarbonate sheet having a thickness of 100 micrometers for example, using an ultraviolet-ray hardening resin 15. In this case, the sum of the thickness fluctuation of sheet 14 and the thickness fluctuation of the ultraviolet-ray hardening resin 15 should be 10 micrometers p-p (peak to peak) or below.

For example, the sheet 14 processed into a diameter identical that of the substrate 10 is place via the ultraviolet-ray hardening resin 15 as adhesive on the substrate 10, which is rotated for spreading. Thus, the sheet 14 serves as a weight onto the ultraviolet-ray hardening resin 15 and makes it into a very thin ultraviolet-ray hardening resin layer, enabling to obtain a total thickness fluctuation of 10 micrometers p-p (peak to peak) or below.

Figure 8:
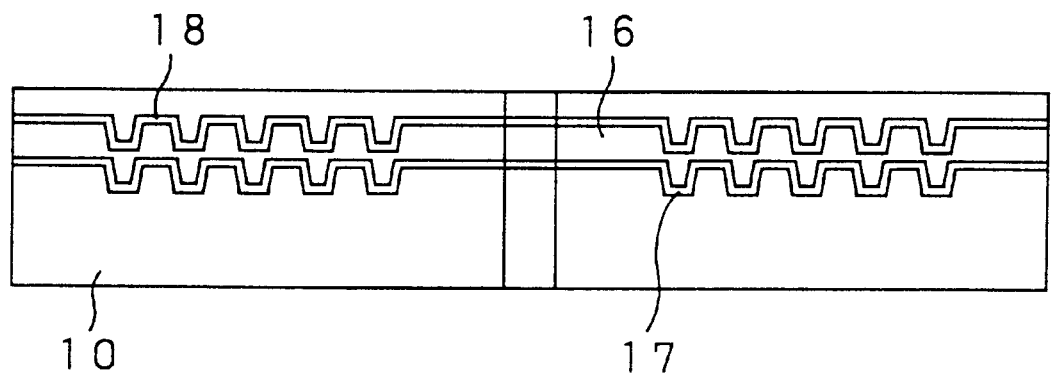
FIG. 8 is a cross sectional view schematically showing an essential portion of still another example of the optical disc according to the present invention.

It should be noted that as shown in FIG. 8, the present invention can also be applied to an optical recording medium having a multi-layer configuration consisting of a first recording layer 17, an intermediate layer 16, and a second recording layer successively formed in this order on the substrate 10.

Figure 9:
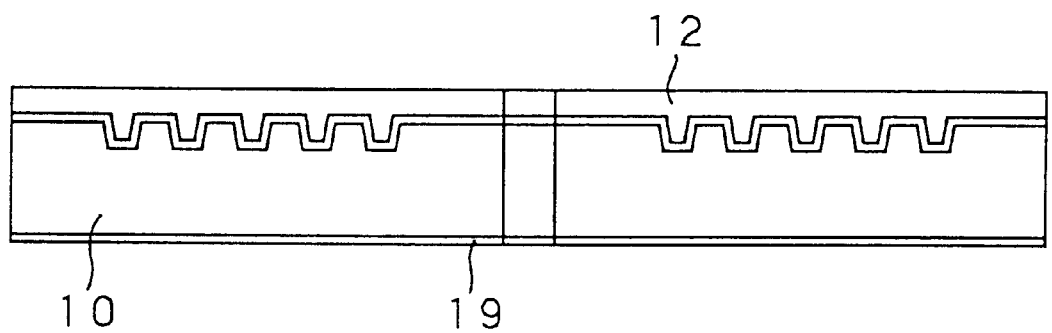
FIG. 9 is a cross sectional view schematically showing an essential portion of yet another example of the optical disc according to the present invention.

Moreover, in the present invention, in order to reduce the skew, as shown in FIG. 9, the water-proof film 19 is formed on the opposite side of the substrate 10 not having the light-transmitting layer 12. This water-proof film 19 not only serves to suppress the skew due to water absorption as has been described above, but also can serve to suppress the skew utilizing the hardening shrinkage in the opposite direction to the hardening shrinkage.

In this case, the water-proof film 19 may be formed by coating a material identical to that of the light-transmitting layer 12, or by applying a material having a higher hardening shrinkage ratio than the ultraviolet-ray hardening resin.

It should be noted that in order to record/reproduce to/from the aforementioned high-density optical recording medium, it is necessary to use a pickup having n objective lens of a high NA as will be detailed later. In this case, it is preferable to set the working distance between the objective lens and the disc surface smaller than the conventional distance.

In this case, the objective lens may collide with the disc surface to scar the disc surface.

Figure 10:
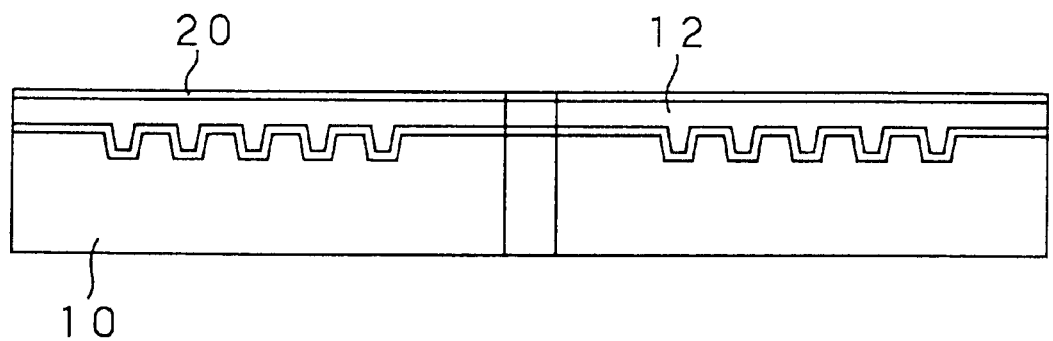
FIG. 10 is a cross sectional view schematically showing an essential portion of yet still another example of the optical disc according to the present invention.

In or to prevent this, it is possible to cover the light-transmitting layer 12 with a hard coat (equal to or harder than the pencil hardness H) as shown in FIG. 10, so that the light-transmitting layer 12 has a comparatively hard surface. Moreover, when the light-transmitting layer 12 has a small thickness, it is easily affected by dust and accordingly, the hard coat 20 may also have a function to prevent charging. This charge prevention enables to prevent adhesion of dusts onto the optical recording medium surface.

Moreover, in the optical recording medium according to the present embodiment, if the wavelength for performing recording and/or reproduction is 780 nm, it is preferable that the light-transmitting layer have a double refraction amount (reciprocal) within the plane be 15 nm in average, and a fluctuation between inner and outer circumferences be 15 nm p-p (peak to peak).

Figure 11:
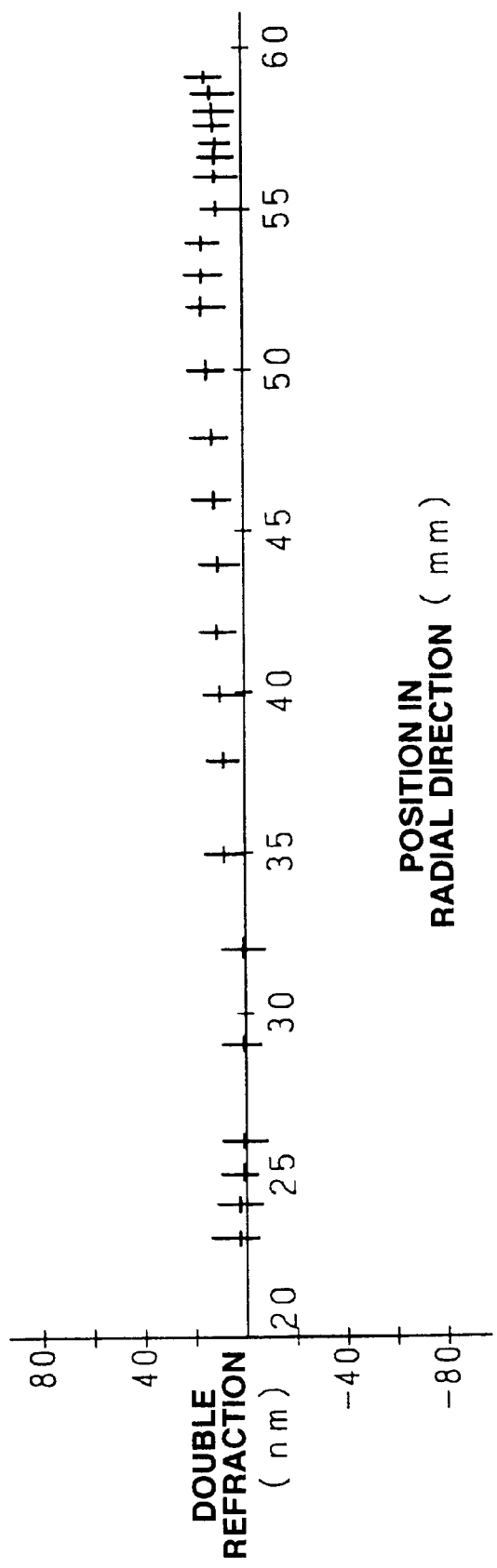
FIG. 11 shows an example of measurement results of the double refraction of the light-transmitting layer of the optical disc according to the present invention.

The optical recording medium of the present embodiment was actually prepared by using a polycarbonate sheet having a thickness of 100 micrometers, for example, to form the light-transmitting layer and a phase change film as the recording layer. This optical recording medium was subjected to a recording/reproduction experiment. In this case, with the line density of 0.21 micrometer/bit, jitter of 8% was obtained. Moreover, the double refraction of the optical recording medium was measured. FIG. 11 shows the measurement result. In FIG. 11, the horizontal axis represents a position in mm in the radius direction and the vertical axis represents a double refraction amount in nm. In FIG. 11, the measurement value distribution is shown by the vertical sections and the positions intersected by horizontal sections indicate average values. It was possible to obtain the double refraction amount reciprocal as 15 nm or below in average and the fluctuation between inner and outer circumferences as 15 nm p-p (peak to peak).

Moreover, the optical recording medium according to the present embodiment was prepared by applying a liquid photo-hardening resin on the information recording layer, which was rotated to spread and photo-hardened to form the light-transmitting layer. The recording layer was a phase change film. This optical recording medium was subjected to the same recording/reproduction experiment.

Figure 12:
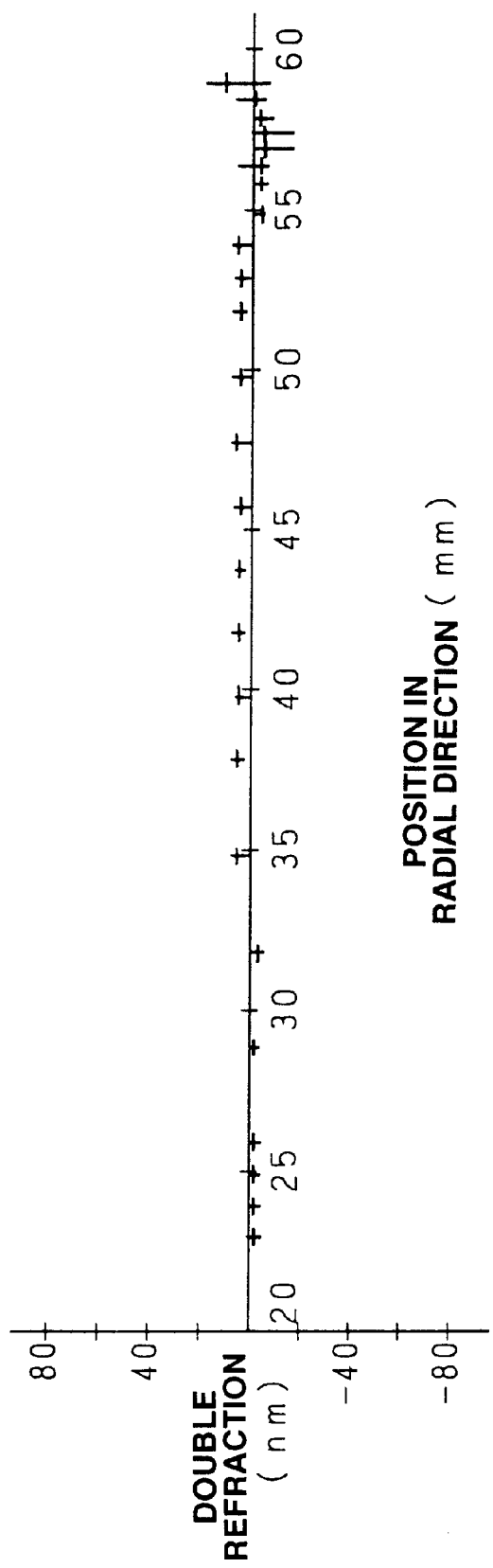
FIG. 12 shows another example of measurement results of the double refraction of the light-transmitting layer of the optical disc according to the present invention.

In this case, it was possible to obtain a line density of 0.21 micrometer/bit and a jitter of 7%. Moreover, the double refraction amount of this optical recording medium was measured. FIG. 12 shows the measurement result. In FIG. 12, the horizontal axis represents a position in mm in the radius direction and the vertical axis represents a double refraction amount in nm. In FIG. 12, the measurement value distribution is shown by the vertical sections and the positions intersected by horizontal sections indicate average values. It was possible to further reduce the double refraction amount compared to the case when the light-transmitting layer was formed from polycarbonate. The double refraction amount reciprocal was 5 nm or below in average and the fluctuation between inner and outer circumferences was 5 nm p-p (peak to peak).

Thus, the optical recording medium according to the present invention has an excellent stable characteristic in comparison to the convention CD and DVD having a within-plane double refraction amount of 100 nm.

Moreover, in the optical recording medium according to the present invention, it is possible to perform a silane finishing to the recording layer forming plane. With this silane finishing, it is possible to increase the adhesion of the ultraviolet-ray hardening resin constituting the light-transmitting layer with the recording layer surface.

Moreover, in the optical recording medium according to the present embodiment, it is possible to form a reflection-preventing film on the light-transmitting layer using the sputter method or the like.

This reflection-preventing film preferably has a diffraction index N lower than that of the light-transmitting-layer. Moreover, if the light performing recording and/or reproduction has a wavelength $\lambda$, it is preferable that the reflection-preventing film have a thickness of $(\lambda/3)/N$ nm or below, and more preferably, $(\lambda/4)/N$ nm.

When the NA is high as in the optical recording medium according to the present embodiment, the incident angle of the recording/reproduction light performing the recording and/or reproduction also becomes significantly large and accordingly, the light reflection at the surface of the light-transmitting layer cannot be ignored.

For example, in the case of NA=0.45, the recording/reproduction light has an incident angle of 26.7 degrees. If NA=0.6, then the incident angle is 36.9 degrees.

When NA=0.8, the incident angle of the recording/reproduction light is as large as 53.1 degrees. It has been confirmed that the light reflection ratio at the surface of the light-transmitting layer depends on the incident angle of the recording/reproduction light. For example, when the light-transmitting layer has a diffraction index of 1.52, the s-polarized component has a surface reflection ratio exceeding 15% (see page 168 of "Laser and Optics Guide" published by Melles Griot Co., Ltd.). In this case, there arises a problem of light quantity loss and the lowering of effective NA.

For this, in order to evade such a problem it is effective to form a reflection-preventing film on the surface of the light-transmitting film.

It is known that the material for the reflection-preventing film preferably has a diffraction index of about 1.23 optically, assuming that the light-transmitting layer has a diffraction index of 1.52 (see "Optical Technique Series 11, Optical Thin Film", page 28, published by Kyoritsu Publisher). However, industrially, for example, $MgF_2$ is used. The $MgF_2$ has a diffraction index N of 1.38.

When the recording/reproduction light has a wavelength of 650 nm, the reflection-preventing film made from $MgF_2$ preferably has a thickness of about 120 nm from the expression $(\lambda/4)/N$ nm.

It has been confirmed that when the reflection-presenting film changes its thickness from 0 to $(\lambda/4)N$ nm, the light reflection quantity on the surface of the light-transmitting layer is minimum at $(\lambda/4)N$ nin. On the other hand, when the reflection-preventing film has a thickness exceeding $(\lambda/4)N$ nm, the light reflection quantity is increased and at its maximum when $(\lambda/2)N$ nm. Thus, it has been confirmed that the reflection-preventing film preferably has ($\lambda$/3)N nm or below in practice, considering the film formation technique from industrial viewpoint.

When the reflection-preventing film is formed on the light-transmitting layer as has been described above, for example, when a single $MgF_2$ layer is formed with a thickness of ($\lambda$/4)/N nm on the light-transmitting layer having a diffraction index of 1.52, by using the recording/reproduction light of 550 nm, for the incident angle of recording reproduction light up to about 60 degrees, it is possible to prevent light quantity lowering of 50% or more (see "Laser and Optics Guide", page 174, Melles Griot Co., Ltd.).

Figure 13:
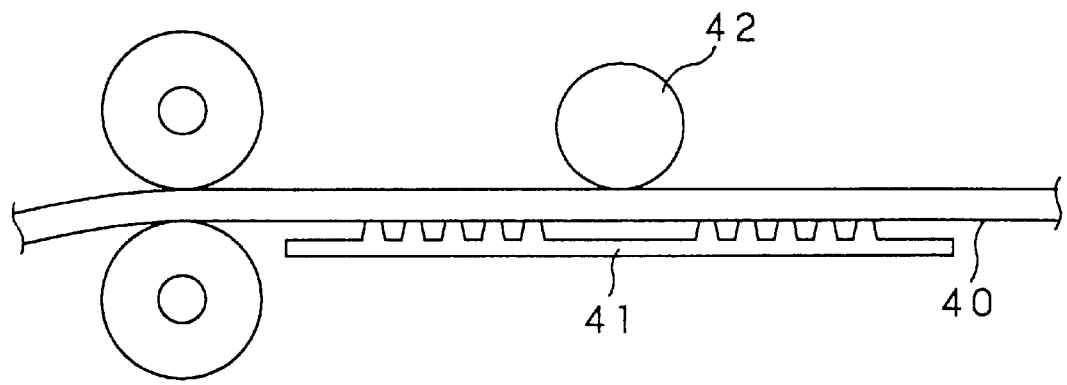
FIG. 13 is a side view schematically showing a step for adhering a sheet onto a stamper.

Description will now be directed to a production procedure of the aforementioned optical recording medium. As shown in FIG. 13, extrusion molding or cast method is used to prepare a polycarbonate sheet 40 having a thickness of 100 micrometers for example. By applying a pressure to roller 41, the polycarbonate sheet 40 is tightly adhered to a stamper 41 heated higher than a temperature to change to glass. Here, the pressure is 280 Kgf for example.

Figure 14:
FIG. 14 is a side view showing a step for forming thin plate substrate.

Thus, as shown in FIG. 14, the information pit or guide groove of the stamper 41 is transferred to the sheet 40, which is then cooled down. The sheet 40 is peeled off from the stamper 41 to form a thin plate substrate 43 having a thickness of 100 micrometers, for example.

Next, in the same way as has been described, a recording film or reflection film s formed, thus finally obtaining a thin type optical recording medium.

Moreover, using the thin plate substrate 43 shown in FIG. 14, it is possible to prepare a multi-layered optical recording medium.

Figure 15:
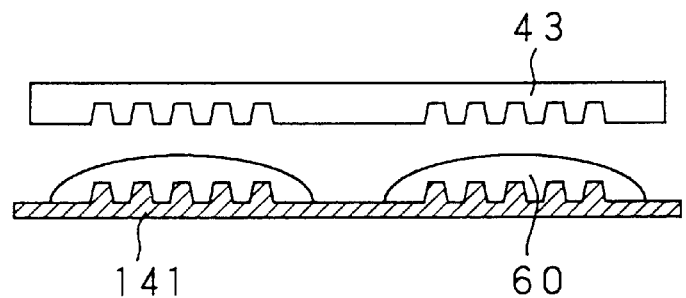
FIG. 15 is a cross sectional view schematically showing a step for providing thin plate substrate on the stamper via an ultraviolet-ray hardening resin.

In this case, firstly, as shown in FIG. 15, a liquid ultraviolet-ray hardening resin 60 is dripped onto the stamper 141 and the recording layer of the thin plate substrate 43 shown in FIG. 14 is brought into contact with the liquid ultraviolet-ray hardening resin 60.

Figure 16:
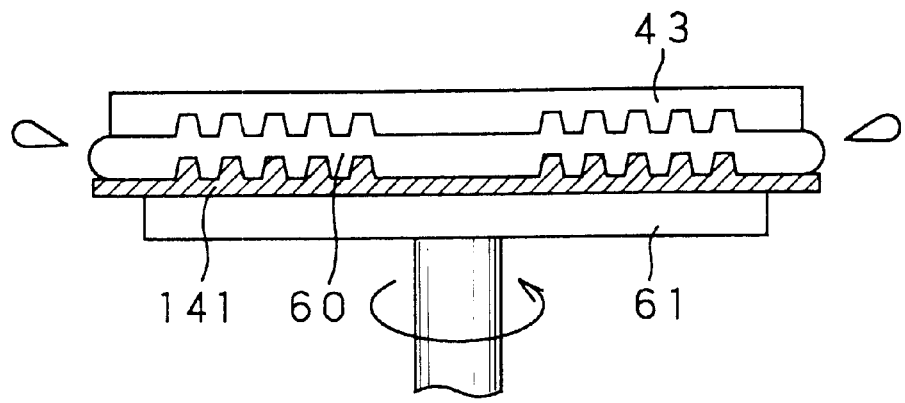
FIG. 16 is a cross sectional view schematically showing a step for spreading the ultraviolet-ray hardening resin.
Figure 17:
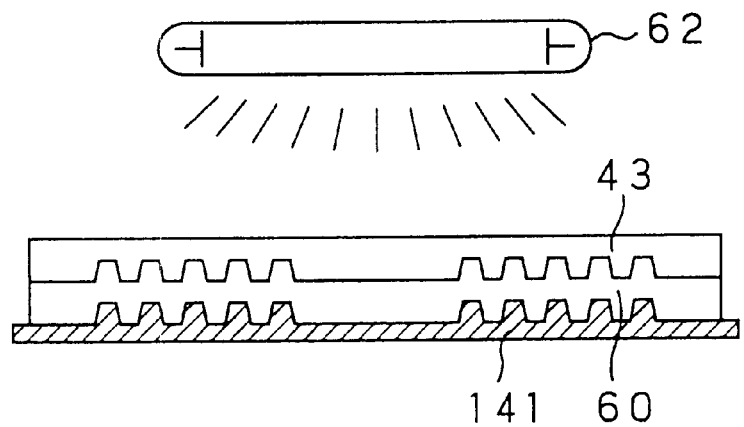
FIG. 17 is a cross sectional view schematically showing a step for hardening the ultraviolet-ray hardening resin.

As shown in FIG. 16, the stamper 141 having the thin plate substrate 43 via the liquid ultraviolet-ray hardening resin 60 is placed on a rotary table 61 and rotated to spread the liquid ultraviolet-ray hardening resin 60 so as to have a desired thickness, for example 20 micrometers. After this, as shown in FIG. 17, ultraviolet rays are applied from a lamp 62 through the thin plate substrate 43 to the liquid ultraviolet-ray hardening resin 60 so as to be photo-hardened.

Figure 18:
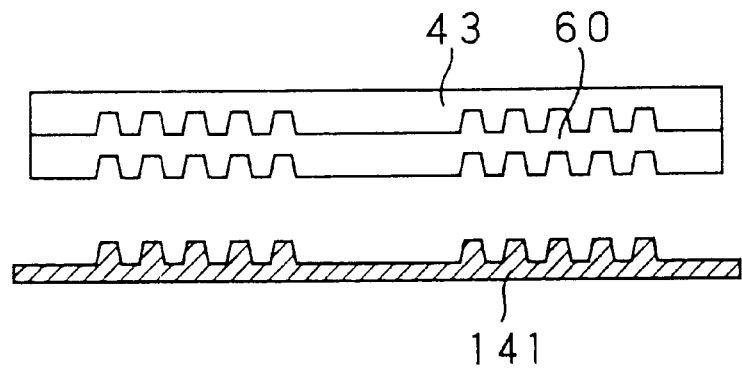
FIG. 18 is a cross sectional view schematically showing a step for peeling off from the stamper.

Subsequently, as shown in FIG. 18, the thin plate substrate 43 together with the photo-hardened ultraviolet-ray hardening resin 60 having a thickness of 20 micrometers for example, is peeled off from the stamper.

As has been described above, the fine convex-concave pattern is transferred from the stamper 141 to the ultraviolet-ray hardening resin 60, and the pattern is covered with Al, Au, or other metal thin film thereby to form a recording layer.

Morever, by repeating the procedure explained with reference to FIG. 15 to FIG. 18, it is also possible to prepare an optical recording medium having an information recording medium or a reflection film and three or more light-transmitting layers successively formed.

Figure 19:
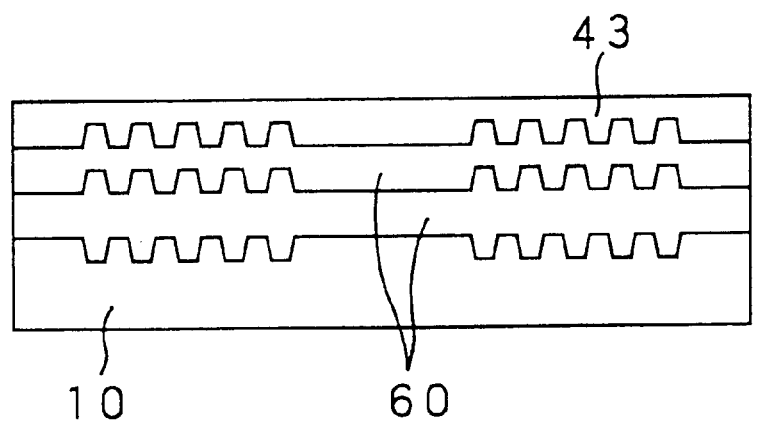
FIG. 19 is a cross sectional view schematically showing an essential portion of yet another example of the optical disc according to the present invention.

As shown in FIG. 19, on the finally obtained recording layer, for example, the substrate 10 obtained by injection molding can be bonded via the ultraviolet-ray hardening resin 60 at an interval of 20 micrometers for example, thus obtaining an optical recording medium having a high rigidity.

Figure 20:
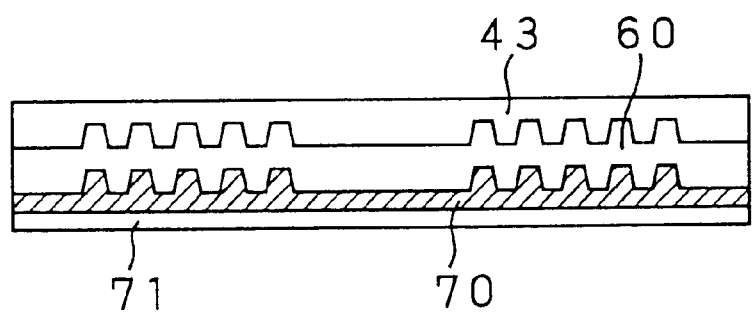
FIG. 20 is a cross sectional view schematically showing an essential portion of still another example of the optical disc according to the present invention.

Moreover, as shown in FIG. 20, the finally obtained recording layer may be covered, for example, with a high-reflection film 70 made from Al, Au or the like, and then protection film 71, so as to obtain a multi-layered thin type optical recording medium.

In this case, if the recording layer consists of N layers, the finally obtained optical recording medium has a thickness as a sum of, for example, 100 micrometers of the thin plate substrate 43, N times of the ultraviolet-ray hardening resin layers between the respective layers, 5 micrometers of the high-reflection film 70 and the protection film 71. That is, if each of the ultraviolet-ray hardening layer has a thickness of 20 micrometers and the high-reflection film 70 and the protection film 71 have a thickness of 5 micrometers when a four-layered optical recording medium is prepared, the entire thickness of the optical recording medium is 185 micrometers.

However, the optical recording medium thus obtained has a very low rigidity. To cope with this, a thick plate having a sufficient rigidity should be bonded to the thin plate substrate 43, or when performing recording or reproduction, it is necessary to utilize that a flexible optical recording medium is made flat by a high-speed rotation.

The value 20 micrometers given as an example of the thickness between the respective recording layers is determined by the number of layers of the finally obtained optical recording medium and the movable distance of a pickup lens used for recording and reproducing to/from this optical recording medium.

Figure 21:
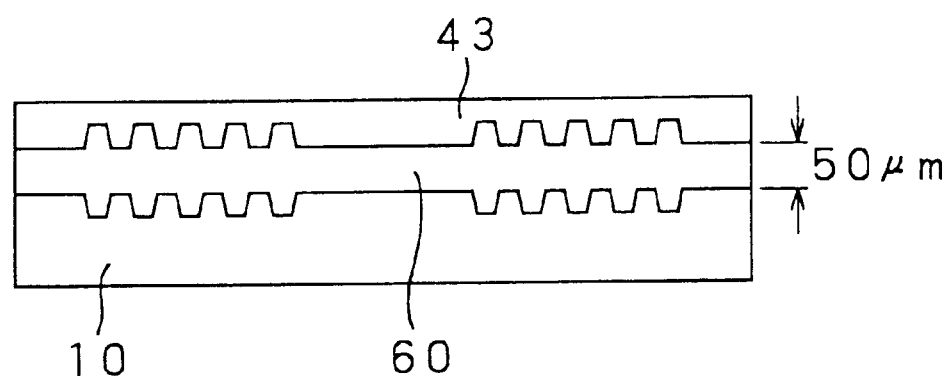
FIG. 21 is a cross sectional view schematically showing an essential portion of still yet another example of the optical disc according to the present invention.
Figure 22:
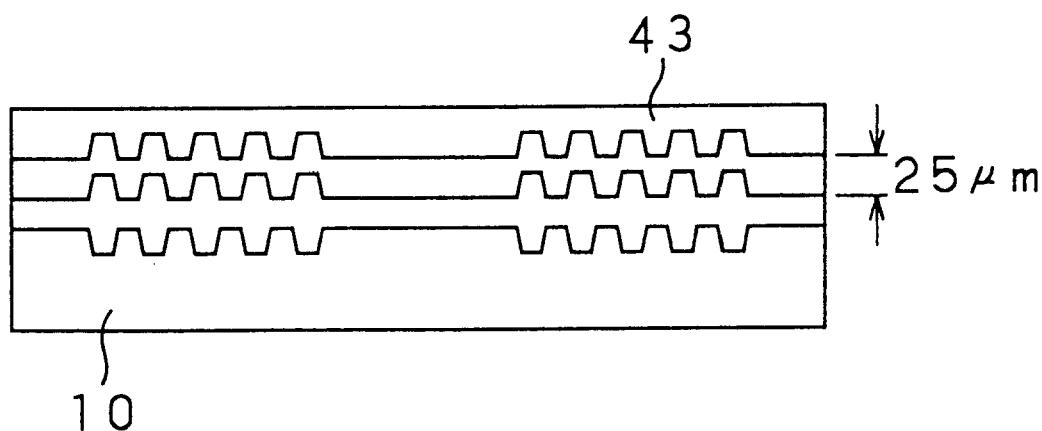
FIG. 22 is a cross sectional view schematically showing an essential portion of still yet another example of the optical disc according to the present intention.

For example, if the lens movable distance, i.e., the interval between the two lenses of the two-lens unit is 50 micrometers, as shown in FIG. 21, the substrate 10 can be bonded to the thin plate substrate 43 via an ultraviolet-ray hardening resin of 50 micrometers. Moreover, as shown in FIG. 22, when producing a three-layered optical recording medium, the recording layers can be formed at an interval of 20 micrometers between the thin plate substrate 43 and the substrate 10.

Figure 23:
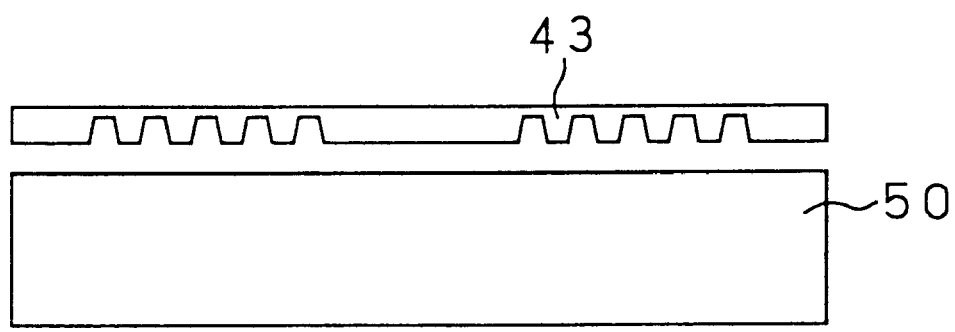
FIG. 23 is a cross sectional view schematically showing an essential portion of yet another example of the optical disc according to the present invention.

Moreover, the present invention can be applied to an optical recording medium as shown in FIG. 23. That is, the thin plate substrata 43 is bonded via an ultraviolet-ray hardening resin, to a disc-shaped substrate having a thickness of 1.1 mm, for example, prepared by injection molding, and ultraviolet rays are applied from the transparent substrate side.

In any of the above-mentioned optical recording media, a water-proof film (not depicted) is formed on the opposite side not having the light-transmitting layer.

Next, explanation will be given on a pit or groove depth formed on the substrate. In the explanation given below, the light-transmitting layer is assumed to have a refractive index N.

The pit or groove depth enabling to obtain the maximum modulation is ($\lambda$/4)/N. The ROM is set to this depth.

Moreover, when a push-pull is used to obtain a tracking error signal in groove recording or land recording, the push-pull signal becomes maximum when the pit or the land has a depth of ($\lambda$/8)/N.

Furthermore, in land/groove recording, the groove depth should be determined, considering the signal characteristic as well as cross talk and cross erase characteristics. Experimentally, the cross talk becomes minimum in the vicinity of $(\lambda/6)/N$ or $(\lambda/3)/N$; and it has been confirmed that the cross erase is less affected as the depth increases. Moreover, considering the groove inclination and the like, the vicinity of $(3\lambda/8)/N$ is optimal to satisfy both of the characteristics. In the present invention, it is preferable that the pit or groove depth is within the aforementioned range.

Figure 24:
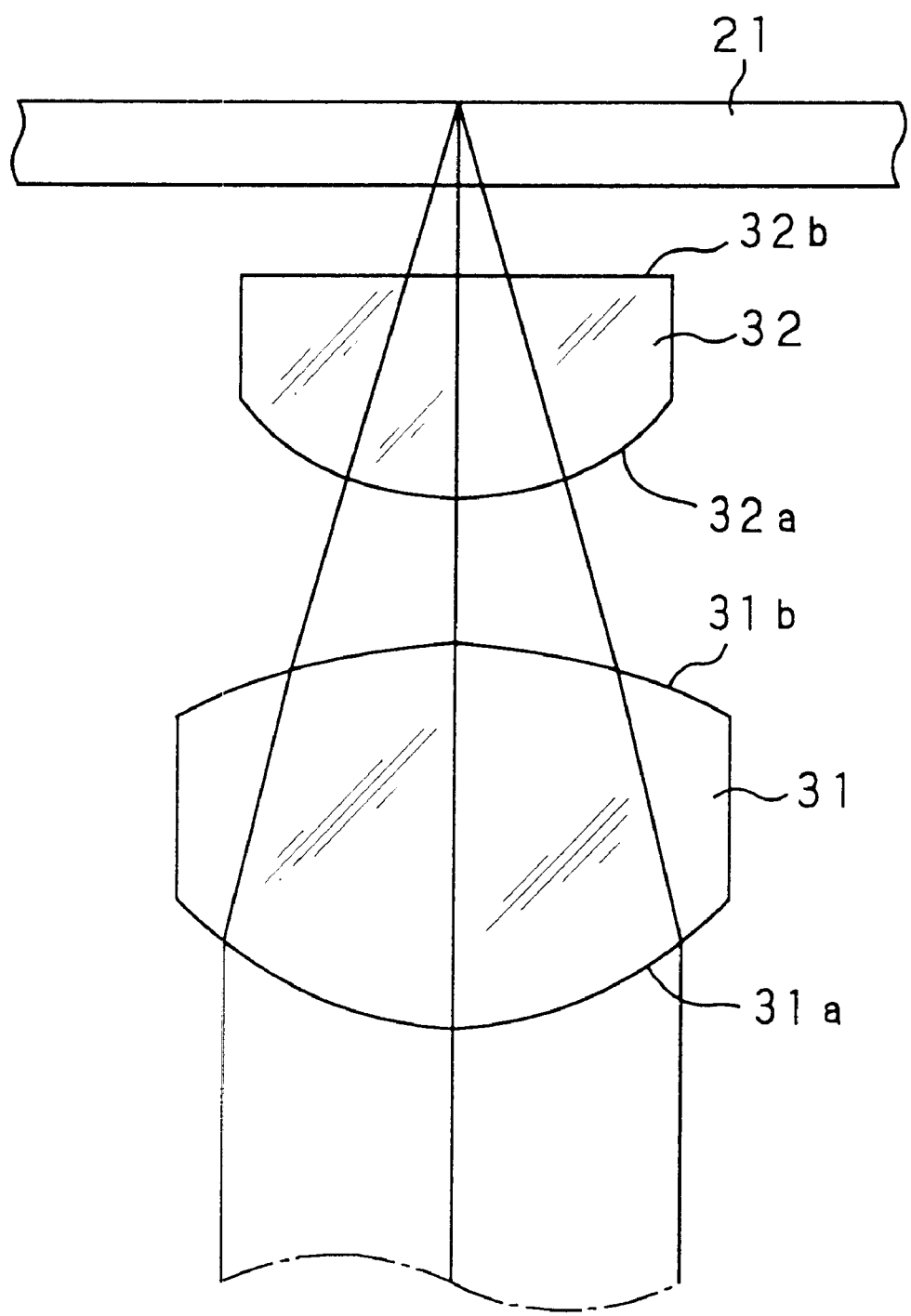
FIG. 24 is an enlarged view of two-lens unit used in an optical disc apparatus for recording/reproducing the optical disc according to the present invention.
Figure 25:
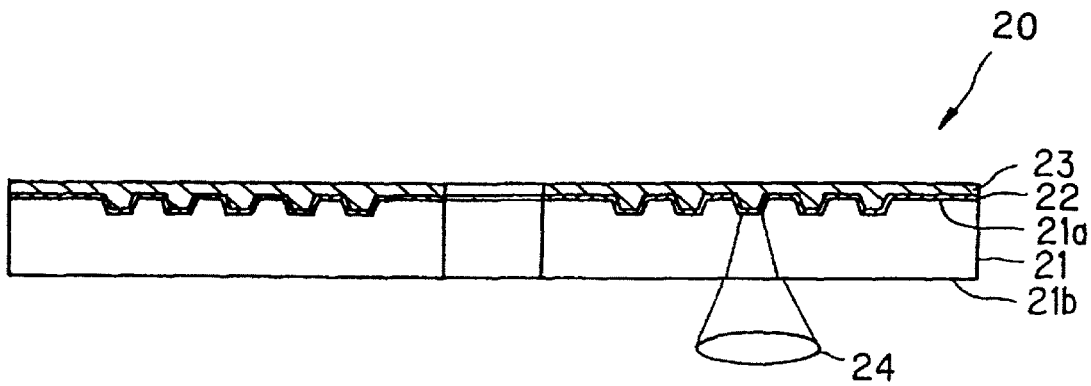
FIG. 25 is a cross sectional view showing a conventional example of optical recording medium.
Figure 26:
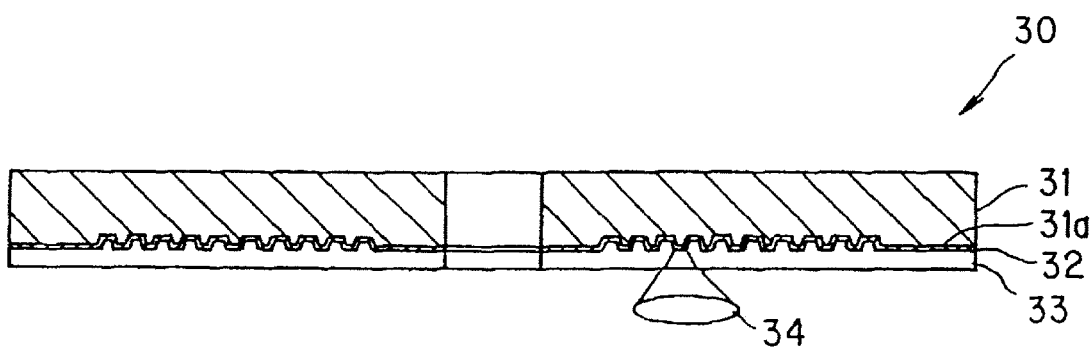
FIG. 26 is a cross sectional view showing another conventional example of optical recording medium having a light-transmitting layer on one main surface of a substrate in which light is applied from the side of this light-emitting layer for recording and/or reproduction.

Next, explanation will be given on an example of a lens configuration for realizing a high NA preferable for the optical disc apparatus according to the present invention. FIG. 24 shows such a lens configuration realizing a high NA.

That is, between a first lens 31 and an optical recording medium 21, there is provided a second lens 32. Thus, by using a two-lens configuration, it is possible to obtain NA of 0.7 or above, and it is possible to reduce the interval (W. D.) between a first surface 32a of the second lens 32 and the surface of the optical recording medium 21.

Moreover, it is preferable that the first surface 31a and the second surface 31b of the first lens 31, and the third surface 32a and the fourth surface 32b of the second lens 32 be aspheric.

In the optical disc apparatus using this two-lens unit, it is possible to perform a high-density recording/reproduction of the aforementioned optical recording medium.

INDUSTRIAL APPLICABILITY

In the optical recording medium according to the present invention, a water-proof film is formed on a main side of the substrate not having the light-transmitting layer, enabling to suppress the skew, which in turn enables to improve the recording/reproduction characteristic as well as to answer to a high-density recording.

Moreover, the optical recording medium according to the present invention can suppresses the water absorption ration to 0.1% or below, thus enabling to effectively suppress the skew. As a result, it is possible to further improve the recording/reproduction characteristics and sufficiently answer to a high-density recording.

Furthermore, the optical recording medium according to the present invention can use a substrate a polycarbonate material which is advantageous for production efficiency, functionability, costs, and the like. Thus, it is possible to improve the yield as well as to reduce the production cost.

Besides, in the optical recording medium according to the present invention, at least in the area of an information signal section where an information signal is recorded, the thickness t of the light-transmitting layer is defined as t=3 to 177 micrometers, and assuming that the light-transmitting layer has a thickness fluctuation $\Delta t$, the optical system for recording and/or reproducing to/from the optical recording medium has a numerical aperture NA and a wavelength lamda that satisfy the relationship $\Delta t \leq \pm 5.26\ (\lambda/NA^4)$; the track pitch P is defined as $P \leq 0.64$ micrometers; the skew $\Theta$ is defined as $\Theta \leq 84.115$ degrees $(\lambda/MA^3/t)$; the wavelength lamda is defined as $\lambda \leq 0.68$ micrometers; and the numerical aperture NA satisfies $NA/\lambda \geq 1.20$. If these conditions are satisfied by the recording/reproduction optical system, it is possible to obtain a sufficiently high NA for a high capacity and to obtain a recording capacity of 8 GB or above for example. Moreover, the optical recording medium according to the present intention enables to obtain a high capacity compared to the conventional apparatus, using a simple recording/reproduction apparatus.

What is claimed is:

1. An optical recording medium comprising: a recording layer and a light-transmitting layer successively formed on one side of a substrate so that a light is applied from said side having the light-transmitting layer, so as to perform information recording/reproduction; and a water-proof film including at least one layer formed on the opposite side of said substrate from said one side of said substrate having said light-transmitting layer so that said substrate is positioned between said light-transmitting layer and said water-proof film layer.

2. An optical recording medium as claimed in claim 1, wherein said recording layer includes a metal reflection film and/or a recording film.

3. An optical recording medium as claimed in claim 1, wherein the side of said substrate having said water-proof film has a water absorption ratio of 0.1% or below.

4. An optical recording medium as claimed in claim 1, wherein said water-proof film is made from at least one of metal, alloy, dielectric film, and organic film.

5. An optical recording medium as claimed in claim 4, wherein said water-proof film is made from at least one of Al, Cr, stainless steel alloy, Pt, Ti Au, Ag, Cu, Ni, SiNxOy, SiOx, SiNx, and SiC.

6. An optical recording medium as claimed in claim 1, wherein said water-proof film is made from Al and has a thickness of 10 nm or above.

7. An optical recording medium as claimed in claim 1, wherein said water-proof film is covered by a corrosion-preventing film.

8. An optical recording medium as claimed in claim 7, wherein said corrosion-preventing film is made from an acryl urethane ultraviolet-ray hardening resin.

9. An optical recording medium as claimed in claim 1, wherein at least in an information signal section of said recording layer where an information signal is recorded, said light-transmitting layer has a thickness t defined as t=3 to 177 micrometer and, assuming that said light-transmitting layer has a thickness fluctuation $\Delta t$, an optical system for recording and/or reproducing to/from said optical recording medium has a numerical aperture NA and a wavelength $\lambda$ that satisfy the relation: $\Delta t \leq \pm 5.26\ (\lambda/NA^4)$ micrometers.

10. An optical recording medium as claimed in claim 9, wherein if P is a track pitch and $\Theta$ is a skew, then $P \leq 0.64$ micrometers and $\Theta \leq \pm 84.115$ degrees $(\lambda/NA^3/t)$ are satisfied.

11. An optical recording medium as claimed in claim 9, wherein recording or reproduction is performed using an optical system that satisfies the wavelength lamda as $\lambda \leq 0.68$ micrometers and the numerical aperture NA as $NA/\lambda \geq 1.20$.

12. An optical recording medium as claimed in claim 9, said medium being a flat disc-shaped having an outer diameter of 125 mm or below and a thickness of 1.60 mm or below.

13. An optical recording medium as claimed in claim 9, said medium having a recording capacity of 8 GB.

14. An optical recording medium as claimed in claim 9, wherein if said light-transmitting layer assumed to have a refractive index of N, a groove or information pit has a depth in a range from $(\lambda/8)/N$ to $(3\lambda/8)N$.

15. An optical recording medium as claimed in claim 9, wherein if said medium has a track pitch P, then said medium has a track pitch fluctuation $\Delta P$ defined as $\Delta P \leq \pm 0.04P$ micrometers, an eccentricity E defined as $E \leq 67.57P$ micrometers, and a skew of 0.4 degrees or below.

16. An optical recording medium as claimed in claim 9, wherein the surface to which a recording and/or reproduction light is applied, has a surface roughness $Ra \pm 3\lambda/100$ or below within a spot size area on said surface.

17. An optical recording medium as claimed in claim 9, wherein said substrate is made from a thermoplastic resin having a thickness of 0.3 to 1.2 mm; a guide groove is transferred onto said substrate; on said guide groove, multiple layers are successively formed or an organic pigment is applied by spin coating, so as to form a recording layer; and said recording layer is coated with at least one kind of ultraviolet-ray hardening resin with a thickness of 3 to 177 micrometers to form a light-transmitting layer.

18. An optical recording medium as claimed in claim 17, wherein said ultraviolet-ray hardening resin is applied onto a surface of the recording layer which has been subjected to silane finishing.

19. An optical recording medium as claimed in claim 9, wherein said substrate is made from a thermoplastic resin having a thickness of 0.3 to 1.2 mm, onto which a guide groove is transferred, which groove is covered with a multi-layered film or an organic pigment coating to serve as a recording layer, to which is bonded a light-transmitting film via an ultraviolet-ray hardening resin, so as to obtain a total thickness of 3 to 177 micrometers.

20. An optical recording medium as claimed in claim 19, wherein said ultraviolet-ray hardening resin is applied onto a surface of the recording layer which has been subjected to silane finishing.

21. An optical recording medium as claimed in claim 9, wherein said light-transmitting layer is a sheet formed by injection molding or cast method, to which sheet a signal or guide groove has been transferred from a master stamper by heating to a high temperature.

22. An optical recording medium as claimed in claim 21, wherein said sheet having said signal or guide groove transferred, is bonded to a support substrate having a thickness of 0.6 to 1.2 mm.

23. An optical recording medium as claimed in claim 22, wherein said support substrate is a transparent plate.

24. An optical recording medium as claimed in claim 22, wherein said support substrate is adhered via an ultraviolet-ray hardening resin to a sheet having a signal or guide groove transferred.

25. An optical recording medium as claimed in claim 24, wherein said ultraviolet-ray hardening resin is applied by spin coating.

26. An optical recording medium as claimed in claim 9, said medium having a multi-layered configuration consisting of a plurality of recording films or reflection films as recording layers and a plurality of light-transmitting layers.

27. An optical recording medium as claimed in claim 26, wherein said plurality of reflection films have a reflection index gradually reduced toward the light incident side.

28. An optical recording medium as claimed in claim 9, wherein an ultraviolet-ray hardening resin is also applied to the opposite side of the substrate not having said light-transmitting layer.

29. An optical recording medium as claimed in claim 28, wherein said ultraviolet-ray hardening resin applied to the opposite side not having said light-transmitting layer has a higher hardening shrinkage ratio than that of a material constituting said light-transmitting layer.

30. An optical recording medium as claimed in claim 9, wherein said light-transmitting layer is coated with a hard coating.

31. An optical recording medium as claimed in claim 9, wherein said light-transmitting layer is covered with a reflection preventing film.

32. An optical recording medium as claimed in claim 31, wherein said reflection preventing film has a reflection index N lower than a refraction index of said light-transmitting layer, and a thickness equal to or below $(\lambda/3)/N$ nm assuming lamda for a wavelength for performing recording and/or reproduction.

33. An optical disc apparatus for recording and/or reproducing to/from an optical disc including a recording layer and a light-transmitting layer successively formed on one side of a substrate, said light-transmitting layer having a thickness t defined as t=3 to 177 micrometers at an information signal section of said recording layer where an information signal is recorded, and a water-proof film including at least one layer formed on the opposite side of said substrate from said one side of said substrate having said light-transmitting layer so that said substrate is positioned between said light-transmitting layer and said water-proof film layer, and said apparatus comprising a laser source having a wavelength $\lambda$ of 680 nm or below; and a lens having a numerical aperture NA of 0.7 or above for focusing a laser beam on a signal recording plane of said optical disc.

34. An optical disc apparatus as claimed in claim 33, wherein if said light-transmitting layer of said optical disc has a thickness fluctuation $\Delta t$, then an optical system for recording and/or reproducing to/from said optical disc has a numerical aperture NA and a wavelength lamda, that satisfy the relationship: $\Delta t \leq \pm 5.26 \, (\lambda/NA^4)$ micrometers.

35. An optical disc apparatus as claimed in claim 33, wherein said lens is constituted by two lenses.

36. An optical disc apparatus as claimed in claim 33, wherein said lens has a numerical aperture equal to or above 0.78.

* * * * *